(12) United States Patent
Westerhaus et al.

(10) Patent No.: US 11,248,118 B2
(45) Date of Patent: Feb. 15, 2022

(54) TACKIFIER FOR RUBBER COMPOSITIONS

(71) Applicant: BASF SE, Ludwigshafen am Rhein (DE)

(72) Inventors: Felix Alexander Westerhaus, Ludwigshafen (DE); Frank Reuter, Ludwigshafen (DE); Dieter Rodewald, Ludwigshafen (DE); Olivier Fleischel, Ludwigshafen (DE); Stephan Schlitter, Ludwigshafen (DE); Martin Voelkert, Ludwigshafen (DE); Fritz Nimtz, Ludwigshafen (DE); Ulrich Abel, Ludwigshafen (DE); Guenter Scherr, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 330 days.

(21) Appl. No.: 16/466,832

(22) PCT Filed: Nov. 30, 2017

(86) PCT No.: PCT/EP2017/081051
§ 371 (c)(1),
(2) Date: Jun. 5, 2019

(87) PCT Pub. No.: WO2018/104151
PCT Pub. Date: Jun. 14, 2018

(65) Prior Publication Data
US 2020/0255654 A1    Aug. 13, 2020

(30) Foreign Application Priority Data
Dec. 6, 2016   (EP) .................................. 16202416

(51) Int. Cl.
*C08L 65/02*   (2006.01)
*C08G 61/10*   (2006.01)
*C08L 9/06*   (2006.01)

(52) U.S. Cl.
CPC ............. *C08L 65/02* (2013.01); *C08G 61/10* (2013.01); *C08L 9/06* (2013.01); *C08G 2261/1412* (2013.01); *C08G 2261/1422* (2013.01); *C08L 2205/06* (2013.01)

(58) Field of Classification Search
CPC ...... B60C 2001/0033; B60C 2001/005; B60C 2001/0058; B60C 2001/0066; B60C 2001/0075; B60C 2001/0083; B60C 2001/0091; B60C 1/00; B60C 1/0008; B60C 1/0016; B60C 1/0025; B60C 1/0041; C08L 9/00; C08L 9/02; C08L 9/04; C08L 9/06; C08L 9/08; C08L 9/10; C08L 2205/06; C08L 65/00; C08L 65/02; C08L 65/04; C08L 61/00; C08L 61/02; C08L 61/04; C08L 61/06; C08L 61/12; C08L 61/14; C08L 61/16; C08L 61/18; C08L 61/20; C08L 61/22; C08L 61/24; C08L 61/26; C08L 61/28; C08L 61/30; C08L 61/32; C08L 61/34; C08J 3/12
See application file for complete search history.

(56) References Cited

U.S. PATENT DOCUMENTS

| 3,421,565 | A | 1/1969 | Reinbold |
| 3,514,417 | A * | 5/1970 | Bickel ....................... C08L 9/00 156/307.1 |
| 2009/0056845 | A1 | 3/2009 | Sandstrom et al. |
| 2009/0218024 | A1 | 9/2009 | Tsou et al. |
| 2010/0317781 | A1 | 12/2010 | Pille-Wolf et al. |
| 2012/0118468 | A1 | 5/2012 | Hahn |
| 2013/0014880 | A1 | 1/2013 | Tsou et al. |
| 2014/0124115 | A1* | 5/2014 | Ogasawara ........... B60C 1/0008 152/510 |

(Continued)

FOREIGN PATENT DOCUMENTS

| CN | 105733041 A | 7/2016 |
| DE | 734 493 | 4/1943 |
| EP | 2 033 812 A1 | 3/2009 |

(Continued)

OTHER PUBLICATIONS

International Search Report dated Mar. 6, 2018 in PCT/EP2017/081051 filed Nov. 30, 2017.

*Primary Examiner* — Christopher M Rodd
(74) *Attorney, Agent, or Firm* — Grüneberg and Myers PLLC

(57) ABSTRACT

A tackifier comprising a resin with repeating units of formula (I) wherein $R^1$ is a linear or branched alkylen group with 1 to 10 carbon atoms and $R^2$ is a linear or branched, saturated or unsaturated aliphatic hydrocarbon group with up to 20 carbon atoms and a non-aromatic compound which consists to at least 50% by weight of one or more linear or branched, saturated or unsaturated aliphatic hydrocarbon groups with at least 4 carbon atoms.

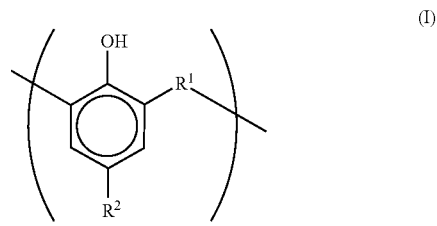

(I)

13 Claims, No Drawings

(56) References Cited

U.S. PATENT DOCUMENTS

2017/0121490 A1    5/2017    Miyazaki

FOREIGN PATENT DOCUMENTS

| EP | 2 452 830 A1 | 5/2012 |
| EP | 3 085 734 A1 | 10/2016 |
| GB | 1 514 283 | 6/1978 |
| GB | 1 522 170 | 8/1978 |
| WO | WO 2009/155747 A1 | 12/2009 |

* cited by examiner

TACKIFIER FOR RUBBER COMPOSITIONS

Object of the present invention is a tackifier comprising a resin with repeating units of formula I

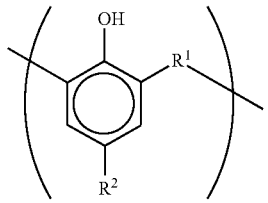

wherein R1 is a linear or branched alkylen group with 1 to 10 carbon atoms and R2 is a linear or branched, saturated or unsaturated aliphatic hydrocarbon group with up to 20 carbon atoms
and a non-aromatic compound which consists to at least 50% by weight of one or more linear or branched, saturated or unsaturated aliphatic hydrocarbon groups with at least 4 carbon atoms.

A well-known tackifier according to formula I is Koresin®, a resin sold by BASF, described for example in DE 734 493. Koresin® is added as tackifier to rubber compositions for the manufacturing of rubber articles, which are in particular tires for cars or trucks. Koresin® is a resin made by reacting para tertiary butyl phenol with acetylene.

The rubber composition has to be compounded with the tackifier. In order to get a homogenous composition, the temperature has to be high enough to ensure the melting of the resin. Tackifiers with high glass transition points, respectively high softening points, require high compounding temperatures.

Technical processes are advantageously performed at lower temperatures. Low temperature processes save energy, preserve the materials used and reduce exposure to volatile compounds.

Therefore, tackifiers with low glass transition points or softening points are preferred for the compounding process.

However, the use a tackifier with a low glass transition point or softening point should have no negative impact on the application properties of the finally obtained products.

For the preparation of many rubber products a high tackiness of the rubber composition is important.

In the production of rubber products a certain number of non-vulcanized rubber parts prepared from the same or different rubber composition are put together to form a desired rubber composite. The rubber parts should have a high adhesion and stick to each other strongly. In the next step the rubber composite is vulcanized at high temperatures. In vulcanization the rubber becomes crosslinked, the rubber parts become strongly bonded to each other and the final rubber product with good mechanical properties, for example a tire, is formed.

It was an object of the invention to provide a tackifier with a low glass transition point, respectively a low softening point. The use of a tackifier with a low glass transition point, respectively low softening point should, however, have only low negative impact or better no negative impact on tackiness of rubber compositions and hence on the mechanical properties of the finally obtained products.

Accordingly, the tackifier defined above and its use as tackifier in rubber compositions have been found.

To the Resin

The resin comprises repeating units of formula I

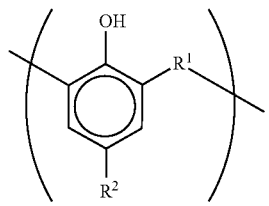

wherein $R^1$ is a linear or branched alkylen group with 1 to 10 carbon atoms and $R^2$ is a linear or branched, saturated or unsaturated aliphatic hydrocarbon group with up to 20 carbon atoms.

Preferably, $R^1$ in formula I is a linear or branched alkylen group with 1 to 4 carbon atoms. In a particularly preferred embodiment of the invention $R^1$ in formula I is $CH_2$ or HC—CH or $H_2C$—$CH_2$.

Preferably, $R^2$ in formula I is a linear or branched, saturated or unsaturated aliphatic hydrocarbon group with 4 to 10 carbon atoms. In a particularly preferred embodiment of the invention $R^2$ in formula I is a linear or branched, saturated or unsaturated aliphatic hydrocarbon group with 4 carbon atoms. In a most preferred embodiments $R^2$ is para-tertiary-butyl.

Resins with $R^1$=$CH_2$ may be obtained by reacting a phenyl compound of formula $R^2$—$C_6H_4$—OH with formaldehyde. In this reaction formaldehyde adds to a carbon atom of $R^2$—$C_6H_4$—OH (usually the carbon atom in ortho position to the OH group) followed by reaction of the obtained methylol group with further $R^2$—$C_6H_4$—OH under elimination of water. The obtained resin may to some extent be crosslinked as further formaldehyde might add to the less reactive meta position.

Resins with $R^1$=HC—$CH_3$ or $R^1$=$H_2C$—$CH_2$ may be obtained by reacting a phenyl compound of formula $R^2$—$C_6H_4$—OH with acetylene. In this reaction acetylene adds to a carbon atom of $R^2$—$C_6H_4$—OH (usually the carbon atom in ortho position to the OH group) followed by reaction of the obtained vinyl group with further $R^2$—$C_6H_4$—OH. The obtained resin may to some extent be crosslinked as further acetylene might add to the less reactive meta position.

Most preferred resin is Koresin®, a resin marketed by BASF, and which is obtainable by reacting acetylene and para tertiary butyl phenol.

Koresin® comprises units of formula II

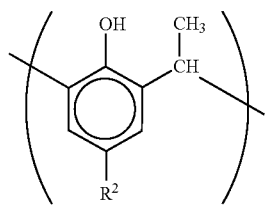

Due to an alternative integration of the acetylene in the reaction Koresin® may further comprise units of formula III

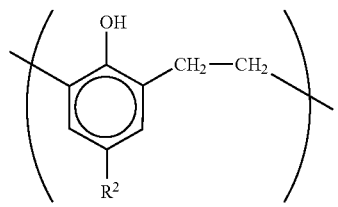

$R^2$ in formula II and III is para tertiary butyl.

End groups of the polymeric molecules of Koresin® may in particular be vinyl groups which result from acetylene.

The resin may comprise further structural elements which are incorporated by using co-monomers or reactive additives as further starting materials in the reaction.

Preferably, at least 80% by weight of the starting materials used for the preparation of the resin are $R^2$—$C_6H_4$—OH and formaldehyde (in case of $R^1$=$CH_2$) or $R^2$—$C_6H_4$—OH and acetylene (in case of $R^1$=HC—$CH_3$ or $R^1$=$H_2$C—$CH_2$ or mixtures thereof).

In a more preferred embodiment at least 90%, particularly at least 95% by weight of the starting materials used for the preparation of the resin are $R^2$—$C_6H_4$—OH and formaldehyde (in case of $R^1$=$CH_2$) or $R^2$—$C_6H_4$—OH and acetylene (in case of $R^1$=HC—$CH_3$ or $R^1$=$H_2$C—$CH_2$ or mixtures thereof).

In a most preferred embodiment no other starting materials than $R^2$—$C_6H_4$—OH and formaldehyde (in case of $R^1$=$CH_2$) or $R^2$—$C_6H_4$—OH and acetylene (in case of $R^1$=HC—$CH_3$ or $R^1$=$H_2$C—$CH_2$ or mixtures thereof) are used for the preparation of the resin.

To the Non-Aromatic Compound

The tackifier further comprises a non-aromatic compound which consists to at least 50% by weight of one or more linear or branched, saturated or unsaturated aliphatic hydrocarbon groups with at least 4 carbon atoms.

Preferably, the non-aromatic compound consists to at least 60% by weight, in particular to at least 70%, respectively at least 80% by weight of linear or branched, saturated or unsaturated aliphatic hydrocarbon groups with at least 4 carbon atoms.

The hydrocarbon groups may preferably be hydrocarbon groups with at least 6 carbon atoms, in particular with at least 8 carbon atoms, respectively with at least 10 carbon atoms. Carbon groups that have a direct bond to another atom than hydrogen are not considered as member to a hydrocarbon group. Usually, the number of carbon atoms of the hydrocarbon groups will be at maximum 60, in particular at maximum 40 and in preferred embodiments at maximum 20.

In a particularly preferred embodiment the non-aromatic compound consists to at least 80% by weight of linear or branched, saturated or unsaturated, aliphatic hydrocarbon groups with from 10 to 60 carbon atoms.

The non-aromatic compound may be a pure hydrocarbon which does not comprise any other chemical elements or functional groups.

The non-aromatic compound may be a hydrocarbon compound comprising one or more hydrocarbon groups and further functional groups. In a preferred embodiment the further functional groups are selected from groups comprising oxygen or nitrogen atoms.

Preferably, such further functional groups are alcohol groups, primary, secondary or tertiary amino groups, carbonyl groups, such as aldehyde or keto groups, carboxylic acid groups, carboxylic anhydride groups, carboxylic ester groups, carboxylic amid groups or dicarboxylic imide groups.

Preferably, the non-aromatic compound does consist of carbon, hydrogen and optionally of oxygen and nitrogen atoms, only.

In a particularly preferred embodiment the non-aromatic compound does consist of carbon, hydrogen or of carbon, hydrogen and oxygen, only.

In a most preferred embodiment the non-aromatic compound does consist of carbon, hydrogen and oxygen, only.

Preferably, the weight average molecular weight of the non-aromatic compound is from 100 to 2.000 g/mol, in particular from 200 to 1.000 g/mol.

Preferred non-aromatic compounds are
- linear or branched, saturated or unsaturated aliphatic hydrocarbons
- oligomers obtained by reacting unsaturated aliphatic hydrocarbons with unsaturated dicarboxylic acids, dicarboxylic acid anhydrids or dicarboxylic acid amides
- saturated or unsaturated fatty alcohols
- saturated or unsaturated fatty acids
- esters of saturated or unsaturated fatty alcohols with mono-, di-, tri- or tetra carboxylic acids, including saturated or unsaturated fatty acids
- esters of saturated or unsaturated fatty acids with alcohols other than saturated or unsaturated fatty alcohols or
- saturated or unsaturated fatty acid anhydrides or amides.

Preferred linear or branched, saturated or unsaturated aliphatic hydrocarbons are hydrocarbons with 6 to 24 carbon atoms which are fully saturated or which have one or two carbon-carbon double bonds. As example octan, octen, decan, decen, dodecan, dodecen etc. may be mentioned.

A preferred oligomer obtained by reacting unsaturated aliphatic hydrocarbons with unsaturated dicarboxylic acids is polyisobutenyl succinic anhydride known as PIBSA. Polyisobutenyl succinic anhydride is, for example, sold by BASF under the trade name Glissopal SA®. Polyisobutenyl succinic anhydride is obtainable by reacting polyisobutylene (which is the polymer of 2-methylpropen=isobutene) and maleic anhydride. Preferred polyisobutenyl succinic anhydride has a number average molecular weight of from 150 to 3.000 g/mol, in particular from 500 to 1.500 g/mol and has a content of succinic anhydride groups of 0.1 to 3 mol succinic anhydride per 1000 g of polyisobutenyl succinic anhydride.

Preferred saturated or unsaturated fatty alcohols have 6 to 24 carbon atoms, one or two hydroxyl groups and are fully saturated or have one or two carbon-carbon double bonds. As example octanol, decanol, tetradecanol (myristyl alcohol), hexadecanol (cetyl alcohol), octadecanol (stearyl alcohol) may be mentioned.

Preferred saturated or unsaturated fatty acids have 6 to 24 carbon atoms, one or two carboxylic acid groups and are fully saturated or have one or two carbon-carbon double bonds. As example saturated fatty acids such as octanoic acid, decanoic acid, tetradecanoic acid, hexadecanoic acid, octadecanoic acid (stearylic acid) and unsaturated fatty acids such as oleic acid (C18), linoleic acid (C18 with two double bonds) may be mentioned.

Preferred esters of fatty alcohols with mono-, di-, tri- or tetra carboxylic acids are esters of the above mentioned fatty alcohols with acrylic acid, malonic acid, maleic acid, fumaric acid or the above mentioned saturated or unsaturated fatty acids.

Preferred esters of saturated or unsaturated fatty acids with alcohols other than saturated or unsaturated fatty alcohols are esters of the above mentioned fatty acids with low molecular weight alcohols such as ethanol, propanol, isopropanol, or n-butanol.

Preferred saturated or unsaturated fatty acid anhydrides or amides are anhydrides or amids of the above mentioned fatty acids.

Particularly preferred are fatty acid and fatty alcohols.

To the Tackifier and Its Use in Rubber

The tackifier comprises the above resin of formula I and the above a non-aromatic compound.

In a preferred embodiment, the tackifier comprises at least 0.1 part by weight, particularly at least 1 part by weight and in a more preferred embodiment at least 2 parts by weight of the non-aromatic compound per 100 parts by weight of the resin of formula I.

Usually, the tackifier does not comprise more than 100 parts by weight of the non-aromatic compound per 100 parts by weight of the resin of formula I.

In a preferred embodiment the tackifier comprises at maximum 50 parts by weight, in a more preferred embodiment at maximum 30 parts by weight of the non-aromatic compound per 100 parts by weight of the resin of formula I.

In a particularly preferred embodiment the tackifier comprises at maximum 15 parts by weight, in a most preferred embodiment at maximum 10 parts by weight of the non-aromatic compound per 100 parts by weight of the resin of formula I. Preferred are in particular tackifiers comprising 0.1 to 50 parts by weight and in a most preferred embodiment 1 to 10 parts by weight of the non-aromatic compound per 100 parts by weight of the resin of formula I.

The tackifier may comprise further components. In particular, the tackifier may comprise other resins than those of formula I or additives such as stabilizers of any kind. The tackifier might already comprise additives or components which are required or desired in the application, for example stabilizers for rubber or accelerators which are used for the vulcanization of rubber.

In a preferred embodiment the tackifier consists to at least 80% by weight, in a more preferred embodiment to at least 90% by weight and in a particularly preferred embodiment to at least 97% by weight of the resin of formula I and the non-aromatic compound, only. In a most preferred embodiment the tackifier comprises only the resin of formula I and the non-aromatic compound and does not comprise any further components.

The tackifier may be prepared by mixing the non-aromatic compound and the resin by any methods known. Preferably, the non-aromatic compound is added to the melt of the resin. The temperature of the melt, in particular of the molten Koresin, is from 150 to 250° C., in particular from 180 to 230° C. The obtained mixture of resin and non-aromatic compound is preferably stirred until a homogeneous distribution of the non-aromatic compound in the resin is achieved. Preferably, the obtained mixture is converted into solid granules by pastillation. The granules may be stored or transported for further use of the obtained tackifier.

Preferably, the tackifier is used as tackifier in rubber compositions.

The rubber composition comprises the rubber, the tackifier and optionally further components.

The rubber may be any rubber, as well as a natural or a synthetic rubber. Preferably, the rubber is a compound with at least one double bond which can be crosslinked. Natural rubber is a polymer of isoprene.

Synthetic rubber may be, for example, a synthetic polyisoprene, a polybutadiene (BR), a styrene-butadiene copolymer (SBR), an acrylnitril-butadiene copolymer, an ethylene-propylene-diene copolymer or a polychloroprene.

Preferred rubbers are BR or SBR.

In a preferred embodiment, the rubber composition comprises at least 0.1 part by weight, particularly at least 1 part by weight and in a more preferred embodiment at least 2 parts by weight of the tackifier per 100 parts by weight of the rubber.

Usually, the rubber composition does not comprise more than 100 parts by weight of the tackifier per 100 parts by weight of the rubber.

In a preferred embodiment the rubber composition comprises at maximum 50 parts by weight, in a more preferred embodiment at maximum 30 parts by weight of the tackifier per 100 parts by weight of the rubber.

In a particularly preferred embodiment the rubber composition comprises at maximum 15 parts by weight, in a most preferred embodiment at maximum 10 parts by weight of the tackifier per 100 parts by weight of the rubber.

Preferred are in particular rubber composition comprising comprises 0.1 to 50 parts by weight and in a most preferred embodiment 1 to 10 parts by weight of the tackifier per 100 parts by weight of the rubber.

The rubber composition may comprise further additives. In particular, rubber compositions usually comprise a vulcanization agent such as elementary sulfur and an accelerator for the vulcanization, such as, for example, zinc oxide or benzothiazol sulfonamides and in particular N-cyclohexyl-2-benzothiazole sulfonamide (CBS).

Other additives are in particular fillers and pigments, for example carbon black and silica.

The rubber composition may be prepared according to standard mixing procedures, for example by kneading the components such as rubber, tackifier, vulcanization agent and optionally accelerator, pigments and others in as standard equipment like a Banbury mixer.

Preferred is a process for the preparation of a rubber compositions wherein the tackifier is added as melt to rubber. During the addition of the tackifier of the rubber is kept preferably at a temperature from 60 to 150° C., particularly preferred is a temperature of the rubber from 80 to 120° C.

The rubber composition may be used for the manufacturing of rubber articles. In the manufacturing process the rubber compositions, respectively the parts made therefrom, may be vulcanized as usual. Preferred rubber products obtained are in particular tires for cars or trucks. The rubber articles are finally formed by vulcanization, which is usually performed at elevated temperatures.

The products made from the rubber composition may in particular be composites that comprise other materials, for example reinforcing materials, in particular steel cords which are covered by the vulcanized rubber composition.

The tackifier of this invention has a low glass transition point respectively a low softening point and allows the preparation of rubber compositions at lower temperatures, for example at temperatures from 80 to 120° C. Rubber compositions comprising the tackifier have high tackiness which allows the manufacturing of rubber products, in particular tires, with high performance, in particular with very good mechanical properties such as a high stability and stiffness.

EXAMPLES

Procedure for Preparation of Various Mixtures of Koresin and the Non-Aromatic Compound:

Koresin® (200 g) and the non-aromatic compound (in amounts specified in Table 1) were place in a flask equipped with a condenser and mechanical stirrer and heated up to 200° C. The Mixture was then stirred for 3 hours and then cooled down. After the melt had cooled down and solidified the material was removed and analyzed via DSC (Differential scanning calorimetry). The glass-transition temperatures (Tg) were the derived from the DSC data.

TABLE 1

| Experiment Number | Additive | Amount non-aromatic compound in parts by weight per 100 parts by weight of Koresin | Tg [° C.] |
|---|---|---|---|
| 1 | — | — | 110 |
| 2 | Undecylenic acid | 3 | 94.8 |
| 3 | Undecylenic acid | 5 | 88.8 |
| 4 | Undecylenic acid | 7 | 81.9 |
| 5 | Stearic acid | 3 | 101 |
| 6 | Stearic acid | 5 | 112 |
| 7 | Stearic acid | 7 | 87 |
| 8 | PIBSA* | 3 | 101.8 |
| 9 | PIBSA* | 5 | 97.9 |
| 10 | PIBSA* | 7 | 96.8 |
| 11 | Stearyl alcohol | 5 | 91.7 |
| 12 | Stearyl alcohol | 7 | 69.1 |
| 13 | Stearyl alcohol | 8 | 69.5 |
| 14 | Stearyl alcohol | 9 | 68.5 |
| 15 | Stearyl alcohol | 10 | 63.7 |

*the PIBSA used was Glissopal ® SA from BASF

Determination of Tackiness

A rubber formulation with the following composition (in parts by weight) was used:

| | |
|---|---|
| SBR rubber | 100 |
| Process oil | 13 |
| Carbon black | 45 |
| Talc | 17 |
| Polybutadiene | 17 |

The above rubber formulation was compounded on a roller mill with 5 parts by weight of Koresin® (example 1) or of the same amount of mixtures according to example 7 (7 parts by weight of stearic acid), respectively of example 11 (5 parts by weight of stearyl alcohol). After the addition of the tackifier the temperature of the mixture was raised to 120° C. for 3 minutes to ensure a homogenous dispersion of the resin.

Test samples prepared from the finished compound were stored at 23° C. and a relative humidity of 50% for the times given in Table 2.

The tack of the test samples was determined after different storage times as listed in Table 2.

In particular, the tack of these samples was measured with a "Ketjen Tackmeter". Two test samples which had the form of strips are pressed together with a force of 20 N/cm² for 30 seconds. Between the samples there was a Teflon foil with a window to ensure a defined contact area. After release of the force and another 10 seconds for relaxation the strips were separated. The force to separate the two rubber strips from each other was measured in newton (N). A high force corresponds to a high tackiness of the test samples.

TABLE 2

| | Tackiness | | | |
|---|---|---|---|---|
| Storage (days) | Rubber formulation without tackifier | Rubber formulation with Koresin | Rubber formulation with tackifier of example 11 | Rubber formulation with tackifier of example 7 |
| 0 | 16 | 18 | 18 | 17 |
| 1 | 15 | 31 | 25 | 27 |
| 3 | 11 | 15 | 16 | 13 |
| 6 | 7 | 11 | 11 | 9 |

The invention claimed is:

1. A tackifier, comprising:
  a resin with repeating units of the following formula I:

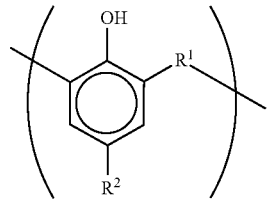

formula I wherein $R^1$ is a linear or branched alkylen group with 1 to 10 carbon atoms and $R^2$ is a linear or branched, saturated or unsaturated aliphatic hydrocarbon group with up to 20 carbon atoms; and
  a non-aromatic compound comprising at least 50% by weight of one or more linear or branched, saturated or unsaturated aliphatic hydrocarbon groups with at least 4 carbon atoms;
  wherein the non-aromatic compound is a fatty acid or a fatty alcohol, and
  wherein the tackifier is solid, and wherein the tackifier has a glass transition temperature in the range of 60° C. to 150° C.

2. The tackifier of claim 1, wherein $R^1$ in formula I is $CH_2$, $HC-CH_3$ or $H_2C-CH_2$.

3. The tackifier of claim 1, wherein $R^2$ in formula I is a linear or branched, saturated or unsaturated aliphatic hydrocarbon group with 4 to 10 carbon atoms.

4. The tackifier of claim 1, wherein the resin is obtained by reacting acetylene and para tertiary butyl phenol.

5. The tackifier of claim 1, wherein the non-aromatic compound comprises at least 80% by weight of linear or branched, saturated or unsaturated, aliphatic hydrocarbon groups with from 10 to 60 carbon atoms.

6. The tackifier of claim 1, wherein the tackifier comprises 0.1 to 50 parts by weight of the non-aromatic compound per 100 parts by weight of the resin of formula I.

7. The tackifier of claim 1, wherein the tackifier comprises at least 80% by weight of the resin of formula I and the non-aromatic compound.

8. A process of preparing the tackifier of claim 1, the process comprising:
  adding the non-aromatic compound to a melt of the resin, to obtain a mixture, and
  converting the obtained mixture into solid granules by pastillation.

9. The process of claim 8, wherein the melt of the resin is molten and has a temperature of 150 to 250° C.

10. A process of preparing a rubber composition, the process comprising adding the tackifier of claim 1 to the rubber.

11. The tackifier of claim 1, wherein the resin comprises units of the following formula II:

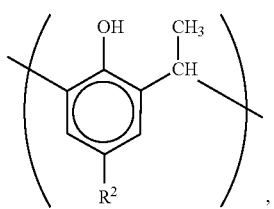

wherein $R^2$ in formula II is para tertiary butyl.

12. The tackifier of claim 1, wherein the resin comprises units of the following formula III:

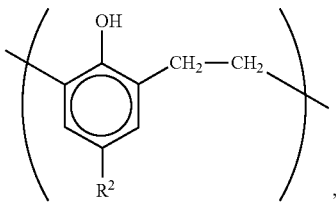

wherein $R^2$ in formula III is para tertiary butyl.

13. The process of claim 10, wherein the tackifier is added to the rubber at a temperature in the range of 60 to 150° C.

* * * * *